(12) United States Patent
Yu

(10) Patent No.: US 9,517,770 B2
(45) Date of Patent: Dec. 13, 2016

(54) BRAKE CONTROL FOR STOP/START VEHICLE

(71) Applicant: Ford Global Technologies, LLC, Dearborn, MI (US)

(72) Inventor: Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/339,887

(22) Filed: Jul. 24, 2014

(65) Prior Publication Data

US 2016/0023660 A1    Jan. 28, 2016

(51) Int. Cl.
| | |
|---|---|
| B60W 30/18 | (2012.01) |
| B60T 7/12 | (2006.01) |
| F02N 11/08 | (2006.01) |
| B60W 10/18 | (2012.01) |
| B60W 10/06 | (2006.01) |
| B60W 10/188 | (2012.01) |

(52) U.S. Cl.
CPC .......... *B60W 30/18118* (2013.01); *B60T 7/12* (2013.01); *B60T 7/122* (2013.01); *B60W 10/06* (2013.01); *B60W 10/182* (2013.01); *B60W 10/188* (2013.01); *B60W 30/18018* (2013.01); *F02N 11/0822* (2013.01); *B60T 2201/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,526,931 | B1 * | 3/2003 | Vilou | F02N 11/0825 123/179.4 |
| 2007/0054773 | A1 * | 3/2007 | Braun | B60T 7/12 477/4 |
| 2008/0086253 | A1 | 4/2008 | Nakayama | |
| 2009/0319161 | A1 | 12/2009 | Abendroth | |
| 2011/0238284 | A1 | 9/2011 | Bollig et al. | |
| 2012/0010044 | A1 | 1/2012 | Gibson et al. | |
| 2012/0295757 | A1 * | 11/2012 | Watanabe | B60W 10/06 477/4 |
| 2013/0296130 | A1 * | 11/2013 | Banker | B60W 10/184 477/27 |
| 2014/0066255 | A1 | 3/2014 | Yu et al. | |
| 2014/0066256 | A1 | 3/2014 | Yu et al. | |
| 2015/0073675 | A1 | 3/2015 | Malone et al. | |

FOREIGN PATENT DOCUMENTS

| | | |
|---|---|---|
| JP | 2012076520 | 4/2012 |
| JP | 2012121357 | 6/2012 |
| WO | 2010102719 A1 | 9/2010 |

OTHER PUBLICATIONS

GB Search Report dated Feb. 8, 2016 for GB1512392.0.

* cited by examiner

*Primary Examiner* — Mark Manley
(74) *Attorney, Agent, or Firm* — Raymond L. Coppiellie; Brooks Kushman P.C.

(57) ABSTRACT

A vehicle is provided with an engine and a controller. The engine is adapted to shutdown and restart during a drive cycle and a controller. The controller is programmed to shutdown the engine in response to brake pressure exceeding a pressure threshold and to restart the engine in response to an accelerator pedal position exceeding a position threshold independent of brake pressure.

16 Claims, 7 Drawing Sheets

BRAKE CONTROL FOR STOP/START VEHICLE

TECHNICAL FIELD

One or more embodiments relate to a vehicle system and method for controlling brake systems during engine shutdown and restart.

BACKGROUND

There are many instances when a vehicle stops before its destination is reached during a typical driving event. This may occur, for example, when the vehicle stops at traffic signals, cross-walks, stop signs and the like. A micro-hybrid vehicle may enable a stop/start strategy for starting and stopping the vehicle engine during a drive cycle. The engine is shutdown if no power is required (e.g. while waiting at a traffic light). As soon as power is requested, the engine is automatically restarted. By avoiding unnecessary engine idling, the vehicle's fuel economy will be improved. For this reason, it is desirable to use the engine shutdown function as much as possible when engine stop conditions are satisfied.

Conventional vehicles typically include a primary brake system and a secondary brake system. The primary brake system is a hydraulic system whereby depression of a brake pedal increases hydraulic pressure within the system which applies one or more brake pads against a rotating member (e.g., a rotor) of each wheel to effect friction braking. The secondary brake system, or parking brake system, is a mechanical system whereby actuation of a lever translates a cable which applies one or more brake pads against a rotating member of each rear wheel.

An electric or electronic parking brake (EPB) system replaces one or more components of the parking brake system with an actuator. There are generally two different types of EPB systems: "cable puller" EPB systems and wheel mount EPB systems. A cable puller EPB system replaces the parking brake lever with an actuator. The actuator is controlled by a switch within the passenger compartment to translate or "pull" the mechanical cables and apply the brake pads. Wheel mount EPB systems include an actuator that is integrated into a wheel mounted brake caliper. Such systems replace the parking brake lever and the mechanical cables.

SUMMARY

In one embodiment, a vehicle is provided with an engine that is adapted to shutdown and restart during a drive cycle and a controller. The controller is programmed to shutdown the engine in response to brake pressure exceeding a pressure threshold and to restart the engine in response to an accelerator pedal position exceeding a position threshold independent of brake pressure.

In another embodiment, a vehicle system is provided with a first brake system adapted to generate a first brake torque and a second brake system adapted to generate a second brake torque. The vehicle system is also provided with a controller that is programmed to increase the first brake torque to a torque threshold in response to engine shutdown, and to decrease the first brake torque and increase the second brake torque in response to a battery voltage decreasing below a voltage threshold.

In yet another embodiment, a method for controlling brake systems during engine shutdown and restart is provided. A first brake system is controlled to increase a first brake torque above a torque threshold in response to an engine shutdown. The first brake system is further controlled to decrease the first brake torque and a second brake system is controlled to increase a second brake torque in response to a battery voltage decreasing below a voltage threshold.

As such the vehicle system provides advantages over existing methods by coordinating the control of the primary brake system and the secondary brake system during engine shutdown to extend the period of time in which the engine is shutdown, which results in improved fuel economy. Additionally, the vehicle system analyzes inputs other than brake pedal position and/or brake pressure to determine when to restart the engine, which allows the driver to relax during extended engine shutdown occurrences.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
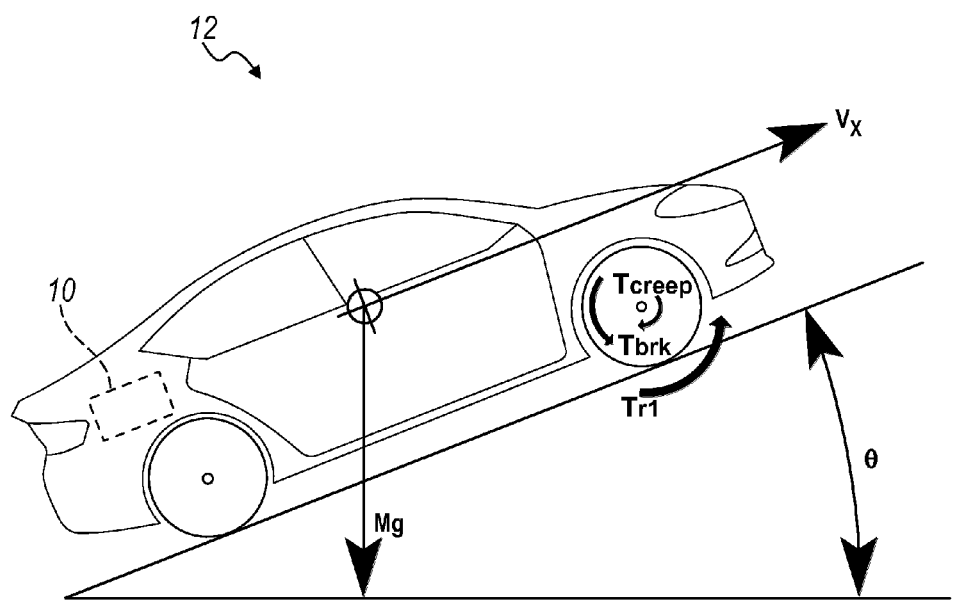
FIG. 1 is a side view of a vehicle illustrated on a road inclined at a gradient.
Figure 2:
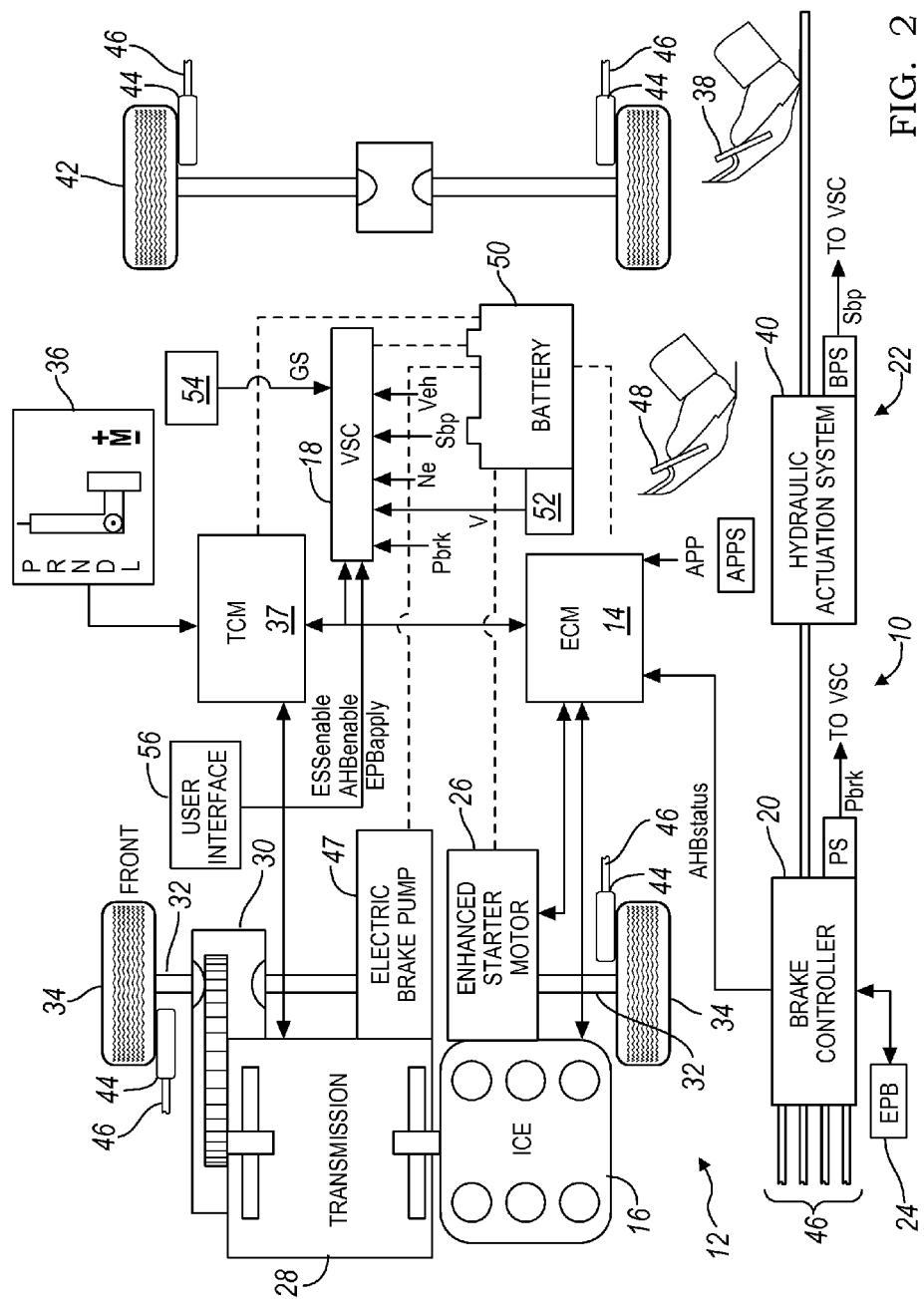
FIG. 2 is a schematic diagram of a vehicle system for controlling brake systems during engine shutdown and restart according to one or more embodiments.

With reference to FIG. 1, a vehicle system for controlling brake systems during engine shutdown and restart is illustrated in accordance with one or more embodiments and is generally referenced by numeral 10. The vehicle system 10 is depicted within a vehicle 12. The vehicle 12 is stopped upon an inclined surface and illustrated with a number of forces and moments acting thereon. The surface has a gradient (road gradient) that is represented by the symbol θ. The resultant torque at the wheels of the vehicle is represented by ($T_{veh}$) and may be calculated using equation 1 as shown below:

$$T_{veh} = T_{creep} + T_{brk} - T_{rl} = 0 \qquad (1)$$

Where Tcreep represents the output torque provided by the engine at idle speed; Tbrk is the total brake torque provided by the vehicle brake system(s); and Trl is the torque acting on the vehicle due to "road load" or external forces. Tcreep is depicted as a positive or clockwise moment, and Trl and Tbrk are depicted as negative or counter-clockwise moments. Tbrk acts against the rotation of the wheels and therefore Tbrk would act as a clockwise moment about the wheels when the vehicle is propelled in a rearward direction by Trl, and Tbrk would act as a counter-clockwise moment about the wheels when the vehicle is propelled in a forward direction by the engine 16. Although each moment is illustrated about a front axle of the vehicle 12, it is understood that Trl and Tbrk act about both the front and rear axles, and Tcreep only acts about the front axle because the engine is not mechanically connected to the rear axle, as shown in FIG. 2. Since the vehicle 12 is at standstill, Tveh is equal to zero and the primary road load is due to gravity. Equation 2 represents an equation for calculating the road load torque (Trl):

$$Trl = Mg\ \mathrm{Sin}(\theta) * Rw \qquad (2)$$

Where M is the mass of the vehicle; g is the acceleration due to gravity; θ is road gradient; and Rw is the radius of the drive wheels.

Referring to FIG. 2, the vehicle includes an engine control module (ECM) 14 for controlling an internal combustion engine (ICE) 16. The vehicle 12 is a micro-hybrid vehicle according to one or more embodiments, and includes an engine 16 that is controlled by the ECM 14 to repeatedly start and stop to minimize fuel consumption. The vehicle 12 also includes a vehicle system controller (VSC) 18 that is in communication with the ECM 14 and the vehicle system 10. The vehicle system 10 includes a brake controller 20 that communicates with the ECM 14 and the VSC 18. The vehicle system also includes a primary brake system 22 and a secondary brake system 24.

Referring back to FIG. 1 and equation 1, the vehicle torque (Tveh) must be equal to zero to maintain the vehicle 12 at standstill on an inclined surface. However, if the ECM 14 shuts down the engine 16, then the creep torque (Tcreep) decreases to zero. To maintain the vehicle 12 at standstill without restarting the engine 16, the vehicle system 10 increases the brake torque (Tbrk) to compensate for the decrease in Tcreep. The brake controller 20 coordinates the control of the primary brake system 22 and the secondary brake system 24 to increase Tbrk when the engine 16 is shutdown to maintain the position of the vehicle 12 and to avoid roll-back.

The vehicle 12 includes an enhanced starter motor 26 that is coupled to an engine crankshaft. The starter motor 26 receives electrical power and provides output torque to the crankshaft for starting the engine 16.

The vehicle 12 includes a transmission 28 for adjusting the output torque of the engine 16. Torque from the engine 16 is transferred through the transmission 28 to a differential 30 by a transmission output shaft. Axle half shafts 32 extend from the differential 30 to a pair of drive wheels 34 to provide drive torque for propelling the vehicle 12.

The vehicle 12 includes a shifter 36 for manually selecting a transmission gear. The shifter 36 includes a sensor (not shown) for providing an output signal that corresponds to a selected transmission gear (e.g., PRNDL). A transmission control module (TCM) 37 communicates with the shifter 36 and the transmission 28 for adjusting the transmission gear ratio based on the shifter selection. Alternatively the shifter 36 may be mechanically connected to the transmission 28 for adjusting the transmission gear ratio.

The brake controller 20 includes a controller that is in electrical communication with the ECM 14 and the VSC 18. The primary brake system 22 includes a hydraulic actuation system 40 that converts the motion of a brake pedal 38 into fluid pressure. The hydraulic actuation system 40 includes a booster and a master cylinder. The brake controller 20 is in fluid communication with the hydraulic actuation system 40.

The vehicle 12 includes the drive wheels 34 and driven wheels 42. Each wheel 34, 42 includes a wheel brake assembly 44, such as a caliper or drum brake assembly. A series of hydraulic lines 46 extend between the brake controller 20 and the wheel brake assemblies 44. The wheel brake assemblies 44 convert the hydraulic pressure into a clamp force that acts upon a rotating member of the wheels to effect friction braking. The brake controller 20 includes antilock braking functionality for pulsating the hydraulic pressure. The brake controller 20 also includes an electric brake pump 47 that may be controlled during auto-hold braking (AHB) to increase the brake pressure within the hydraulic lines 46 when the engine is shutdown.

The primary brake system 22 also includes sensors for providing information that corresponds to current brake characteristics, such as a brake pedal position switch (BPS) for providing a brake pedal state (Sbp) signal that corresponds to a brake pedal position (e.g., applied or released). In other embodiments, the primary brake system 22 includes a position sensor (not shown) for measuring pedal position. The primary brake system 22 also includes one or more sensors for providing output indicative of a braking effort or brake torque that may be measured or derived. In the illustrated embodiment, the sensors include pressure sensors (PS) for providing a brake pressure (Pbrk) signal that corresponds to an actual brake pressure value within the brake system (e.g., brake line pressure or master cylinder pressure).

The vehicle system 10 includes the secondary brake system 24. The secondary brake system is a wheel mount EPB system 24, according to one or more embodiments. A wheel mount EPB system 24 includes an actuator that is integrated into the rear wheel assemblies 44. In other embodiments, the EPB system 24 includes an actuator (not shown) that is mounted to the vehicle frame (not shown) and configured to translate or pull mechanical cables that are connected to the rear wheel assemblies 44.

The brake controller 20 is configured to provide auto-hold brake (AHB) pressure functionality, whereby the brake controller 20 controls or maintains a desired brake torque when the engine is shut down to prevent the vehicle from rolling when stopped on a hill. The brake controller 20 may control the electric brake pump 47 for adjusting the pressure within the hydraulic system and/or control the EPB system 24 for adjusting wheel torque. In one or more embodiments, the brake controller 20 provides a status signal (AHB status) that is indicative of whether or not the AHB functionality is active.

The vehicle 12 includes an accelerator pedal 48 with a position sensor (APPS) for providing an accelerator pedal position (APP) signal that corresponds to a driver demand for propulsion. The ECM 14 controls the throttle of the engine 16 based on the APP signal. In one or more embodiments, the ECM 14 generates a signal (Taccel) that is indicative of a driver demanded acceleration torque at the wheels, based on APP.

The vehicle 12 includes an energy storage device, such as a battery 50. The battery 50 supplies electrical energy to the vehicle controllers and devices, e.g., the electric pump 47 and the starter motor 26, as generally indicated by dashed lines in FIG. 1. The vehicle 12 may include a single battery 50, such as a conventional low voltage battery, or multiple batteries, including a high voltage battery. Additionally, the vehicle 12 may include other types of energy storage devices, such as capacitors or fuel cells. The vehicle 12 includes a sensor 52 which provides a signal (V) that is indicative of a present voltage of the battery 50.

The vehicle 12 also includes a gradient sensor 54 which provides a signal (GS) that is indicative of a gradient or slope of the vehicle. In one or more embodiments, the gradient sensor 54 is an accelerometer that provides GS based in part on a gravity force component. In other embodiments, the gradient sensor 54 is an inclinometer. In one embodiment, the vehicle system 10 includes a road grade estimator or algorithm that determines road gradient based on GS. In other embodiments, the vehicle includes a navigation system (not shown) that provides signals that may be used for road gradient estimation.

The vehicle 12 includes a user interface 56 that communicates with the VSC 18, according to one or more embodiments. The user interface 56 may include a touch screen display and/or a series of knobs and dials (not shown). The user may manually control engine and brake system functionality using the user interface 56. The user interface 56 provides input signals (ESSenable, EPBapply, AHBenable) to the VSC 18 that are indicative of a user request to enable/disable engine start/stop functionality, apply the EPB 24, and enable/disable AHB functionality, respectively.

The VSC 18 communicates with other vehicle systems, sensors and controllers for coordinating their function. As shown in the illustrated embodiment, the VSC 18 receives a plurality of input signals (e.g., ESSenable, AHBenable, EPBapply, Pbrk, engine speed (Ne), Sbp, vehicle speed (Veh), etc.) from various vehicle systems and sensors. Although it is shown as a single controller, the VSC 18 may include multiple controllers that may be used to control multiple vehicle systems according to an overall vehicle control logic, or software. The vehicle controllers, including the VSC 18, ECM 14 and the brake controller 20 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The vehicle controllers communicate with each other and other vehicle systems over one or more wired or wireless vehicle connections using common bus protocols (e.g., CAN and LIN).

The VSC 18 communicates with the ECM 14 to control the shutdown and restart of the engine 16 based on input signals that correspond to brake apply and release conditions. The vehicle system 10 anticipates a vehicle launch event based on brake release conditions. By shutting down the engine 16, a micro-hybrid has improved fuel economy as compared to a conventional vehicle. However, the overall engine idle stop and automatic restart control process should not be perceptible to the driver. To provide transparent or imperceptible control performance relative to a conventional powertrain vehicle, the vehicle system 10 considers a number of brake apply and release conditions, which are described in detail in U.S. application Ser. No. 13/600,804.

Figure 3:
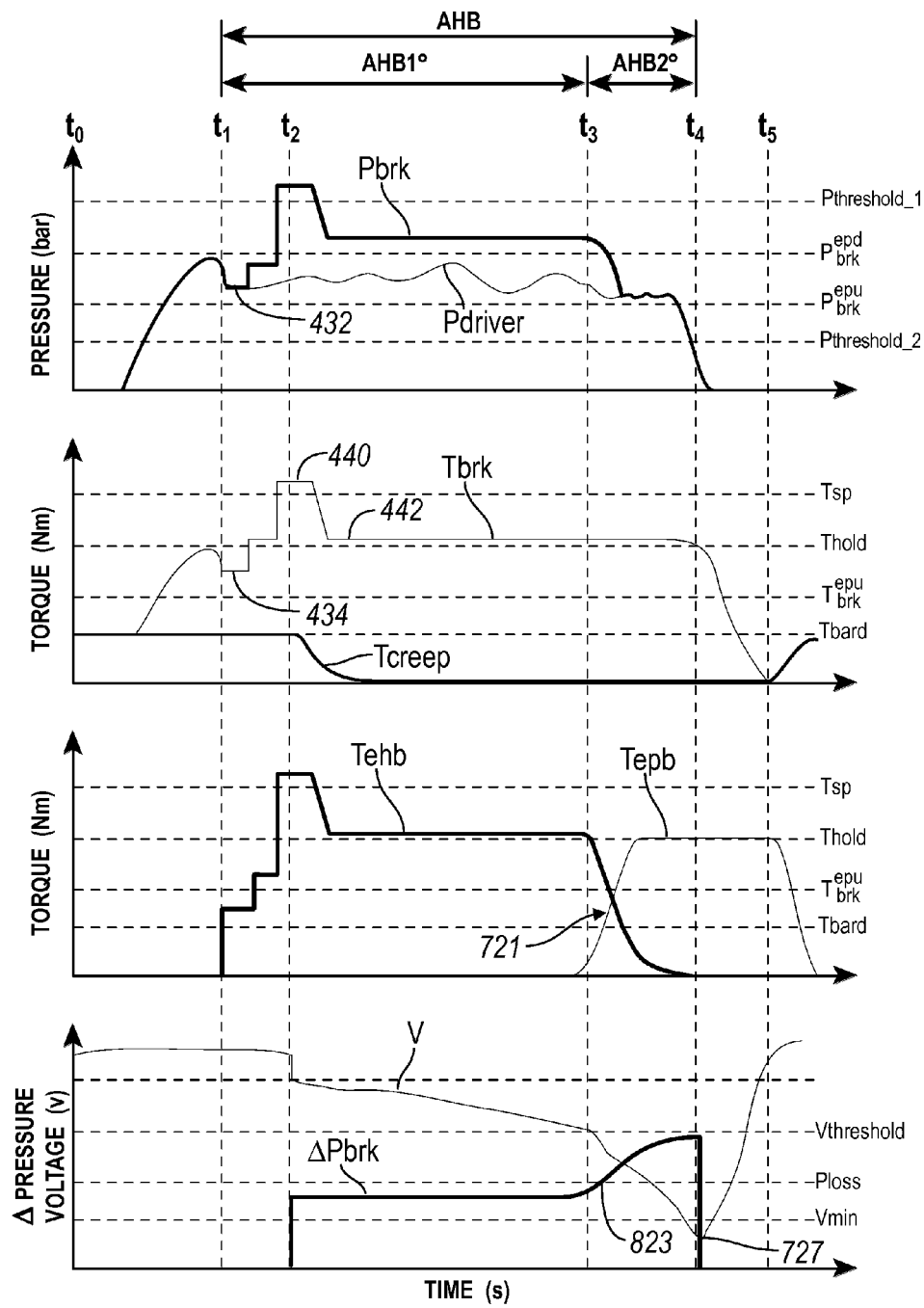
FIG. 3 is a time plot of brake system characteristics during a vehicle standstill event, illustrating the controlled coordination of the brake systems by the vehicle system of FIG. 1.

FIG. 3 is a time plot illustrating waveforms (Pbrk, Pdriver, Tbrk, Tcreep, Tehb, Tepb, V and ΔPbrk) of brake system characteristics during a vehicle standstill event. A first plot includes the Pbrk and Pdriver waveforms. Pbrk represents the actual brake pressure measured within the primary brake system (e.g., within the brake lines or master cylinder). Pdriver represents an estimated brake pressure within the primary brake system corresponding to the force applied by the user to the brake pedal 38. A second plot includes the Tbrk and the Tcreep waveforms. Tbrk represents the total brake torque provided by the vehicle brake systems (i.e., the primary brake system 22 and the secondary 24 brake systems). Tcreep represents the engine output torque at idle speed or "creep torque". A third plot includes the Tehb and the Tepb waveforms. Tehb represents the torque provided by the primary brake system 22 and the electric brake pump 47 during the auto-hold braking. Tepb represents the torque applied by the second brake system 24 (i.e., the EPB system), which may be determined based on current provided to the EPB and/or linear travel of the EPB system 24. A fourth plot includes the V and ΔPbrk waveforms. V represents battery voltage and ΔPbrk represents the change in brake pressure (or pressure loss) during an AHB event.

The waveforms illustrated in FIG. 3 are plotted over a common period of time during a vehicle standstill event. At time ($t_0$) the vehicle is stopped on an inclined surface, as shown in FIG. 1. After $t_0$, the engine 16 is idling and providing creep torque, as indicated by Tcreep; and the driver applies the brake pedal 38, as indicated by the increasing Pbrk and Tbrk waveforms. At time ($t_1$) the AHB system is activated and the driver partially releases the brake pedal 38, as illustrated by the decrease in Pbrk and Tbrk. The AHB functionality may be enabled/disabled by the user through the user interface 56. In one or more embodiments, AHB functionality is enabled by default, and the user may disable AHB functionality using the user interface 56.

The vehicle system 10 is configured to coordinate the brake torque provided by each of the primary brake system 22 and the secondary 24 brake system so that the driver may relax during a vehicle standstill event when the vehicle 12 is stopped on a gradient. This is illustrated by the relatively constant brake pressure (Pbrk) and brake torque (Tbrk) waveforms after $t_2$, despite a variable force applied to the brake pedal by the user, as depicted by the varying Pdriver waveform.

At time ($t_2$) the engine is pulled down. After $t_2$, Tcreep decreases to zero because the engine is shutdown. The vehicle system 10 is configured to disable AHB under certain vehicle conditions, as described below with reference to FIGS. 4-8. At time ($t_3$) the vehicle system 10 coordinates releasing the electric brake pump 47 and activating the EPB system 24. The vehicle system 10 coordinates this transition between AHB using the primary braking system ("AHB 1°") to AHB using the secondary brake system ("AHB 2°") so that the total brake torque (Tbrk) remains constant, as illustrated by the Tbrk waveform between $t_3$ and $t_4$. Additionally, since the EPB system 24 is not coupled to the hydraulic brake system, Tbrk remains constant between $t_3$ and $t_4$, even though Pbrk decreases. The vehicle system 10 is also configured to release the EPB system 24 under certain vehicle conditions, as described below with reference to FIGS. 4-8. At time ($t_4$) the vehicle system 10 instructs the ECM 14 to pull up the engine 16. At time ($t_5$) the vehicle system 10 releases the EPB system 24.

Engine stop start (ESS) and auto-hold braking (AHB) functionality may operate independently of each other. The driver may enable/disable engine stop/start (ESS) and/or auto-hold braking (AHB) using the user interface 56. The vehicle system 10 coordinates ESS functionality with AHB functionality to maximize vehicle fuel economy and improve driver comfort. The vehicle system 10 also coordinates the control of the electric brake pump 47 and the EPB system 24 to provide the AHB functionality. The vehicle system 10 maximizes vehicle fuel economy by minimizing unintended engine pull-ups when the driver releases the brake pedal 38. The vehicle system 10 improves driver comfort by extending the time in which a driver may release the brake pedal during a prolonged vehicle stop on an inclined surface.

Figure 4:
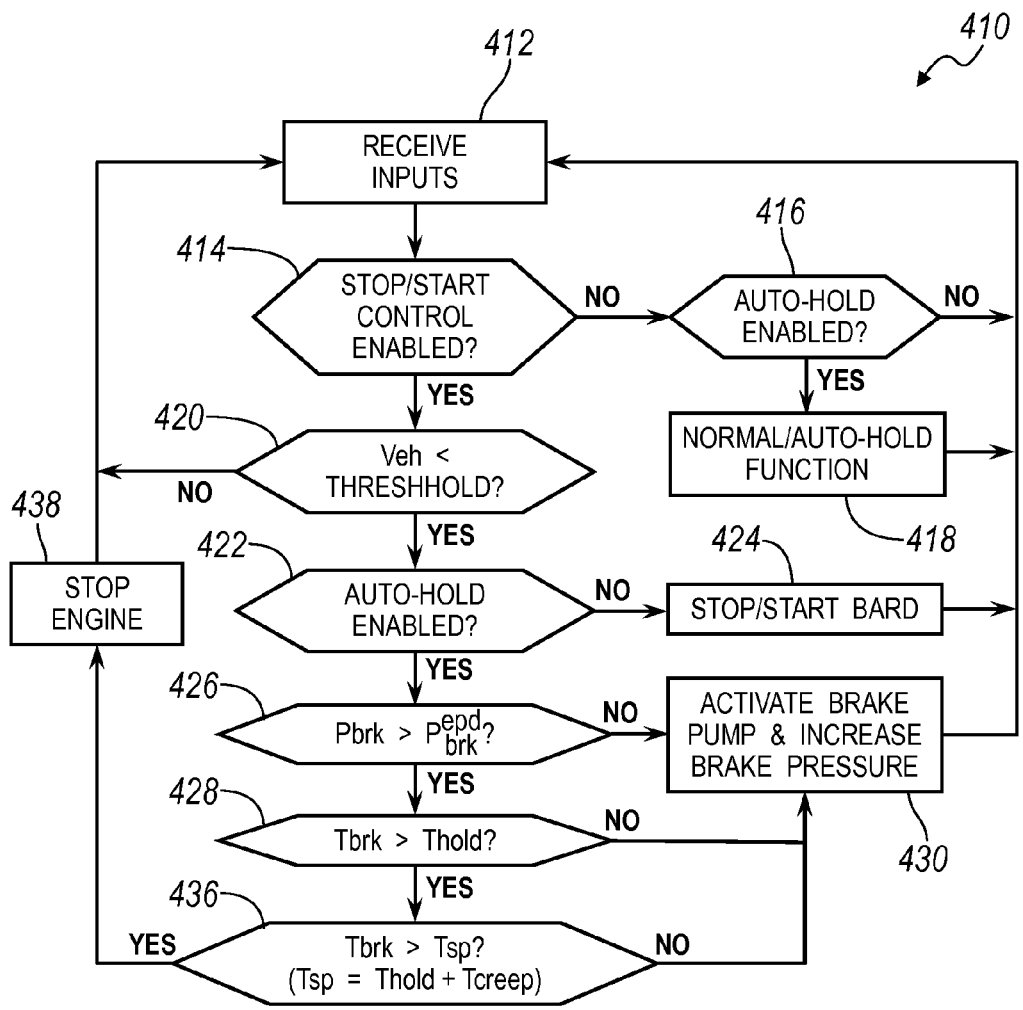
FIG. 4 is a flow chart illustrating a method for controlling brake systems during engine shutdown according to one or more embodiments.

Referring to FIG. 4, a method for controlling brake systems during engine shutdown is illustrated in accordance with one or more embodiments and generally referenced by numeral 410. The method 410 is implemented using software code contained within the brake controller 20 according to one or more embodiments. In other embodiments the software code is shared between multiple controllers (e.g., the ECM 14, the VSC 18 and the brake controller 20).

At operation 412, the vehicle system 10 receives input signals including ESSenable, AHBenable, Veh, and Pbrk. At operation 414 the vehicle system 10 evaluates the ESSenable signal to determine if engine start/stop functionality is enabled. The user may manually disable ESS functionality using the user interface 56. Additionally, vehicle controllers (e.g., the ECM 14) may disable ESS functionality under certain vehicle conditions. If ESS is not enabled, the vehicle system 10 proceeds to operation 416 to determine if AHB is enabled. At operation 416 the vehicle system 10 evaluates the AHBenable signal to determine if auto-hold braking functionality is enabled. The user may manually disable AHB functionality using the user interface 56. Additionally, vehicle controllers (e.g., the brake controller 20) may disable AHB functionality under certain vehicle conditions. If AHB functionality is enabled, then the vehicle system 10 proceeds to operation 418 and provides normal AHB functionality independent of ESS functionality. If the determination at operation 414 is positive, (i.e., engine start/stop control is enabled) then the vehicle system 10 proceeds to operation 420.

At operation 420, the vehicle system 10 evaluates the vehicle speed signal (Veh) to determine if Veh is less than a speed threshold. In one embodiment, the speed threshold is approximately five mph. If Veh is less than the speed threshold, the vehicle system 10 proceeds to operation 422 and evaluates the AHBenable signal to determine if auto-hold braking is enabled. If AHB is not enabled, then the vehicle system 10 proceeds to operation 424 and provides ESS functionality independent of AHB. If the determination at operation 422 is positive then this would indicate that both ESS functionality and AHB functionality are enabled, and the vehicle system 10 proceeds to operation 426 to coordinate their functionality.

At operation 426, the vehicle system 10 evaluates the brake pressure signal (Pbrk) to determine if the brake pressure is greater than an engine pull-down brake pressure threshold ($P_{brk}^{epd}$). $P_{brk}^{epd}$ represents a minimum brake pressure level for holding a vehicle at standstill after the engine is stopped. In one embodiment, $P_{brk}^{epd}$ is calculated according to equation 1 as disclosed in U.S. application Ser. No. 13/600,804. The vehicle system 10 determines torque values based on the brake pressure values including: (Tbrk) which is a torque that corresponds to Pbrk; and (Thold) which is a torque value that corresponds to $P_{brk}^{epd}$. At operation 428, the vehicle system 10 evaluates Tbrk to determine if Tbrk is greater than Thold. If the determination at either of operations 426 and 428 is negative, then the vehicle system 10 proceeds to operation 430 and activates the electric brake pump 47 to increase brake pressure (Pbrk).

Referring back to FIG. 3, points 432 and 434 represent data corresponding to operations 426-430. Point 432 represents a time at which the brake pressure (Pbrk) is less than $P_{brk}^{epd}$, and the vehicle system 10 activates the brake pump 47 to increase brake pressure. Similarly, point 434 represents at time at which the total brake torque (Tbrk) is less than Thold, and the vehicle system 10 activates the brake pump 47 to increase brake pressure, which increases brake torque (Tbrk). If the determination at operation 428 is positive, the vehicle system 10 proceeds to operation 436.

At operation 436, the vehicle system 10 compares the total brake torque (Tbrk) to a brake torque setpoint (Tsp) to determine if Tbrk is greater than Tsp. Tsp corresponds to the sum of Thold and Tcreep. The engine 16 provides creep torque when operating at idle, however Tcreep decreases to zero when the engine is shutdown. Thus, the vehicle system 10 increases the brake pressure (Pbrk) to compensate for Tcreep before turning off the engine, to avoid any rollback of the vehicle. If the determination at operation 436 is negative, the vehicle system returns to operation 430. If the determination at operation 436 is positive, then the vehicle system 10 proceeds to operation 438 and stops the engine 16.

Referring back to FIG. 3, points 440 and 442 represent data corresponding to operations 436 and 438. Point 440 represents a time at which the total brake torque (Tbrk) is greater than Tsp. The vehicle system 10 stops or pulls-down the engine at time $t_2$. After the engine is stopped, the creep torque decreases to zero, and Tbrk decreases to a level that is slightly greater than Thold, and represented by point 442.

Figure 5:
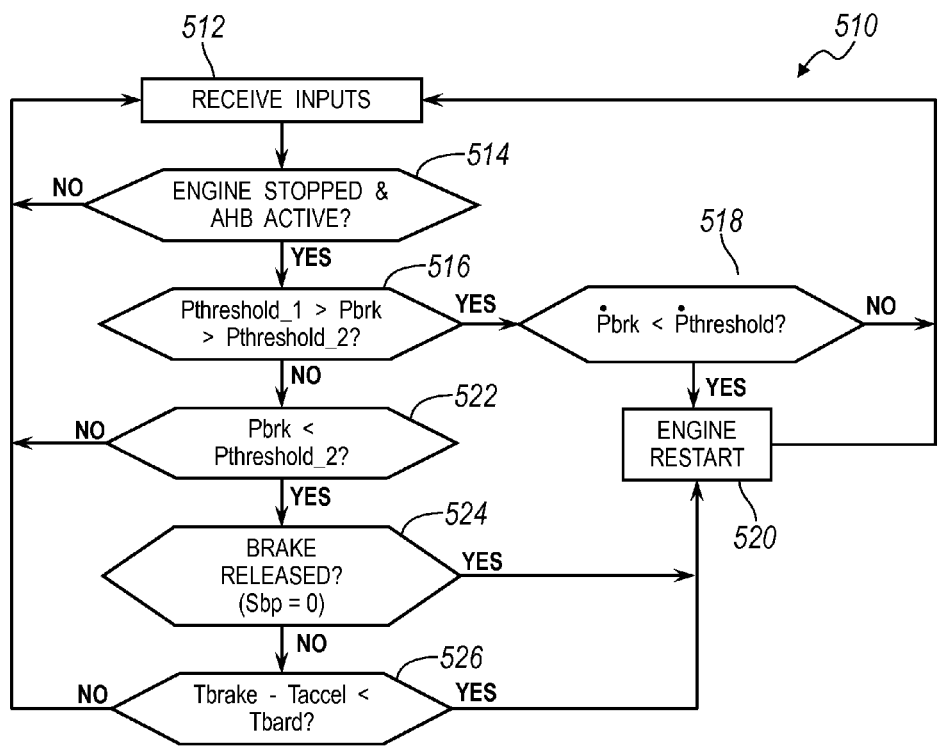
FIG. 5 is a flow chart illustrating a method for coordinating brake systems during engine restart according to one or more embodiments.
Figure 6:
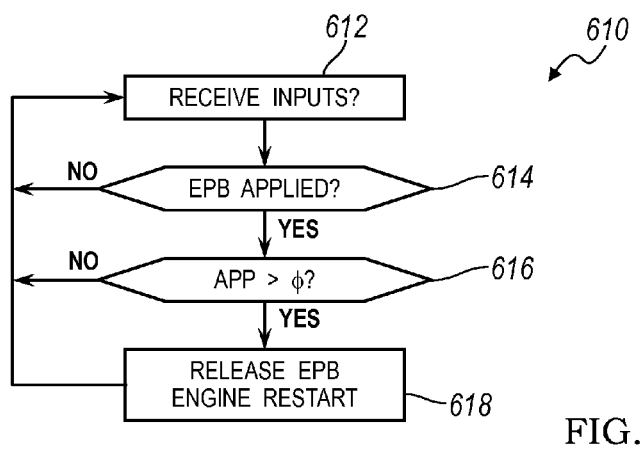
FIG. 6 is a flow chart illustrating a method for coordinating brake systems during engine restart according to another embodiment.

With reference to FIGS. 5 and 6, once the AHB is active and/or the EPB is applied, the vehicle system 10 evaluates the driver's intent for vehicle propulsion according to one or more methodologies. FIG. 5 illustrates a method that is based primarily on brake pressure and brake torque and FIG. 6 illustrates a method that is based primarily on the driver's demand for acceleration torque. Both methods allow the driver to relax and to at least partially release the brake pedal without restarting the engine 16. Existing methods for evaluating a launch request typically look solely at the brake pressure and brake torque and will restart the engine if the driver relaxes, or partially releases the brake pedal.

Referring to FIG. 5, a method for evaluating vehicle propulsion intent based on brake system conditions during engine shutdown is illustrated in accordance with one or more embodiments and generally referenced by numeral 510. The method 510 is implemented using software code contained within the brake controller 20 according to one or more embodiments. In other embodiments, the software code is shared between multiple controllers (e.g., the brake controller 20, the VSC 18 and the ECM 14).

At operation 512, the vehicle system 10 receives inputs including Ne, AHBstatus, Pbrk, Sbp and Taccel. At operation 514, the vehicle system 10 evaluates Ne and AHBstatus to determine if both the engine is stopped and the AHB functionality is active. If the determination is positive, the vehicle system 10 proceeds to operation 516.

At operation 516, the vehicle system 10 evaluates the brake pressure (Pbrk) to determine if Pbrk is within a large brake pressure range (Pthreshold_1>Pbrk>Pthreshold_2). As illustrated in FIG. 3, Pthreshold_1 represents a relatively high brake pressure and Pthreshold_2 represents a relatively low brake pressure. If Pbrk is within the range, then the vehicle system 10 proceeds to operation 518. At operation 518, the vehicle system 10 evaluates a rate of change of the brake pressure (i.e., a brake pressure derivative (Ṗbrk)), to determine if Ṗbrk is less than a derivative threshold (Pthreshold), which would indicate a fast release of the brake pedal 38. If the determination at operation 518 is positive, then the vehicle system 10 proceeds to operation 520 and commands an engine restart. If the determination at operation 516 is negative, indicating that Pbrk is outside of the range, then the vehicle system 10 proceeds to operation 522.

At operation 522, the vehicle system 10 evaluates the brake pressure (Pbrk) to determine if Pbrk is below the low pressure threshold (Pthreshold_2). If the determination at operation 522 is positive, then the vehicle system proceeds to operation 524 to evaluate the brake pedal position signal (Sbp). If the brake pedal is released (e.g., Sbp is zero), then the vehicle system 10 proceeds to operation 520 and commands restart of the engine 16. If the determination at operation 522 is negative, indicating that Pbrk is above the high threshold (Pthreshold_1), then the vehicle system 10 returns to operation 512. If the determination at operation 524 is negative, which would indicate that the driver is partially applying the brake pedal 38 and the brake pressure is low, then the vehicle system 10 proceeds to operation 526.

At operation 526, the vehicle system 10 compares the total brake torque (Tbrake) to the driver demanded acceleration torque (Taccel) to determine if (Tbrake−Taccel) is less than a brake apply and release detection (BARD) torque threshold level (Tbard). Tbard corresponds to a low torque level, as shown in FIG. 3. If the determination at operation 526 is positive, then the vehicle system 10 proceeds to operation 520 and commands restart of the engine 16. The vehicle system 10 returns to operation 512 after operation 520, or in response to a negative determination at operation 514, 518, 522 or 526.

Referring to FIG. 6, a method for evaluating vehicle propulsion intent based on accelerator pedal position during engine shutdown is illustrated in accordance with one or more embodiments and generally referenced by numeral 610. The method 610 is implemented using software code contained within the brake controller 20 according to one or more embodiments. In other embodiments, the software code is shared between multiple controllers (e.g., the brake controller 20, the VSC 18 and the ECM 14).

In operation 612 the vehicle system 10 receives inputs including EPBapply, AHBstatus, Pbrk and APP. At operation 614 the vehicle system 10 evaluates EPBapply to determine if the driver has made a request to apply the EPB. In one or more embodiments, the vehicle system 10 also evaluates the AHBstatus and Pbrk signals to determine if the EPB system 24 has actually been applied. At operation 616 the vehicle system 10 evaluates the accelerator pedal position (APP) signal to determine if APP is greater than a threshold value (φ) that corresponds to a partial pedal apply position, such as twenty degrees or 20%. If the determination at operation 616 is positive, the vehicle system 10 proceeds to operation 618. At operation 618 the vehicle system 10 releases the EPB and commands an engine restart. The vehicle system 10 returns to operation 612 after operation 618, or in response to a negative determination at operation 614 or 616.

Figure 7:
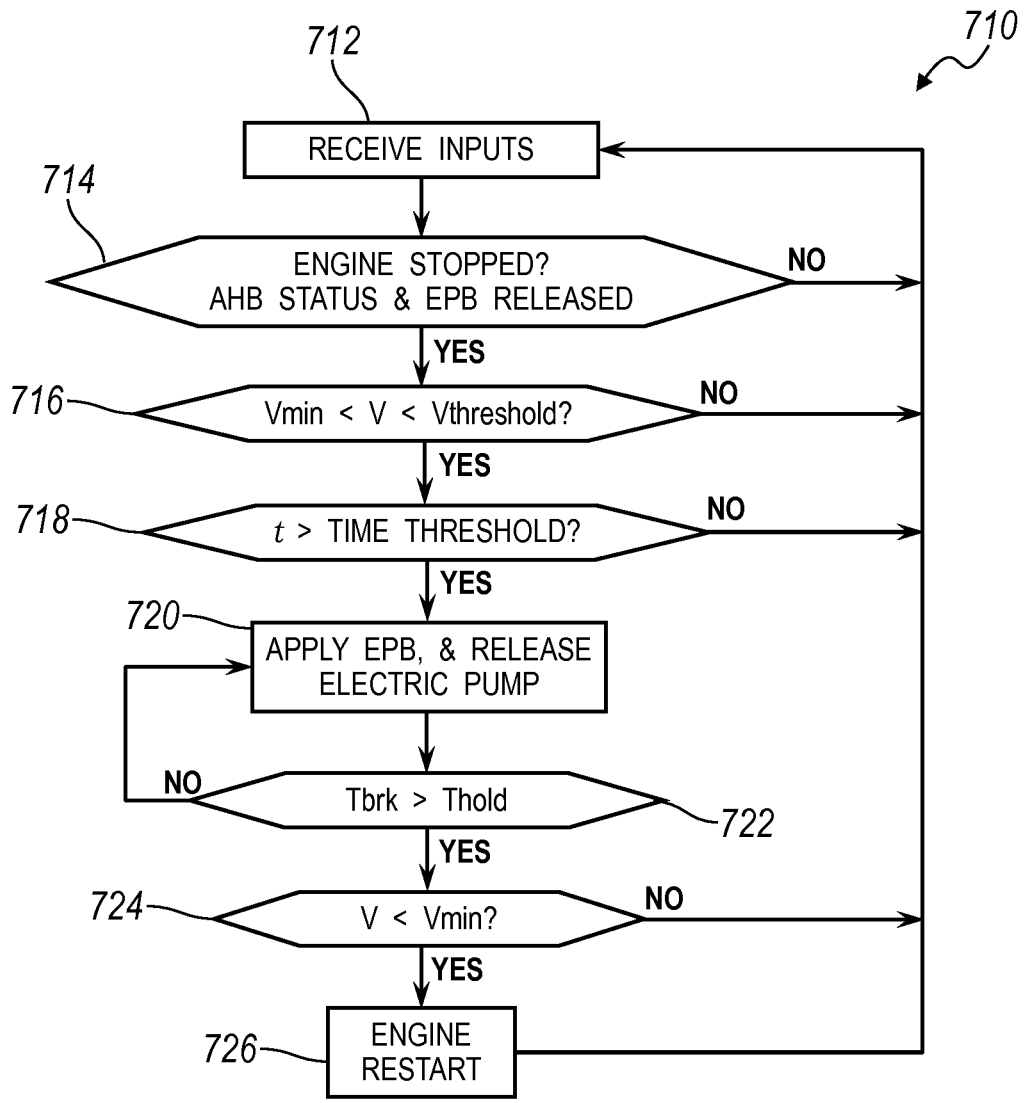
FIG. 7 is a flow chart illustrating a method for coordinating brake systems and monitoring voltage during engine shutdown according to one or more embodiments.
Figure 8:
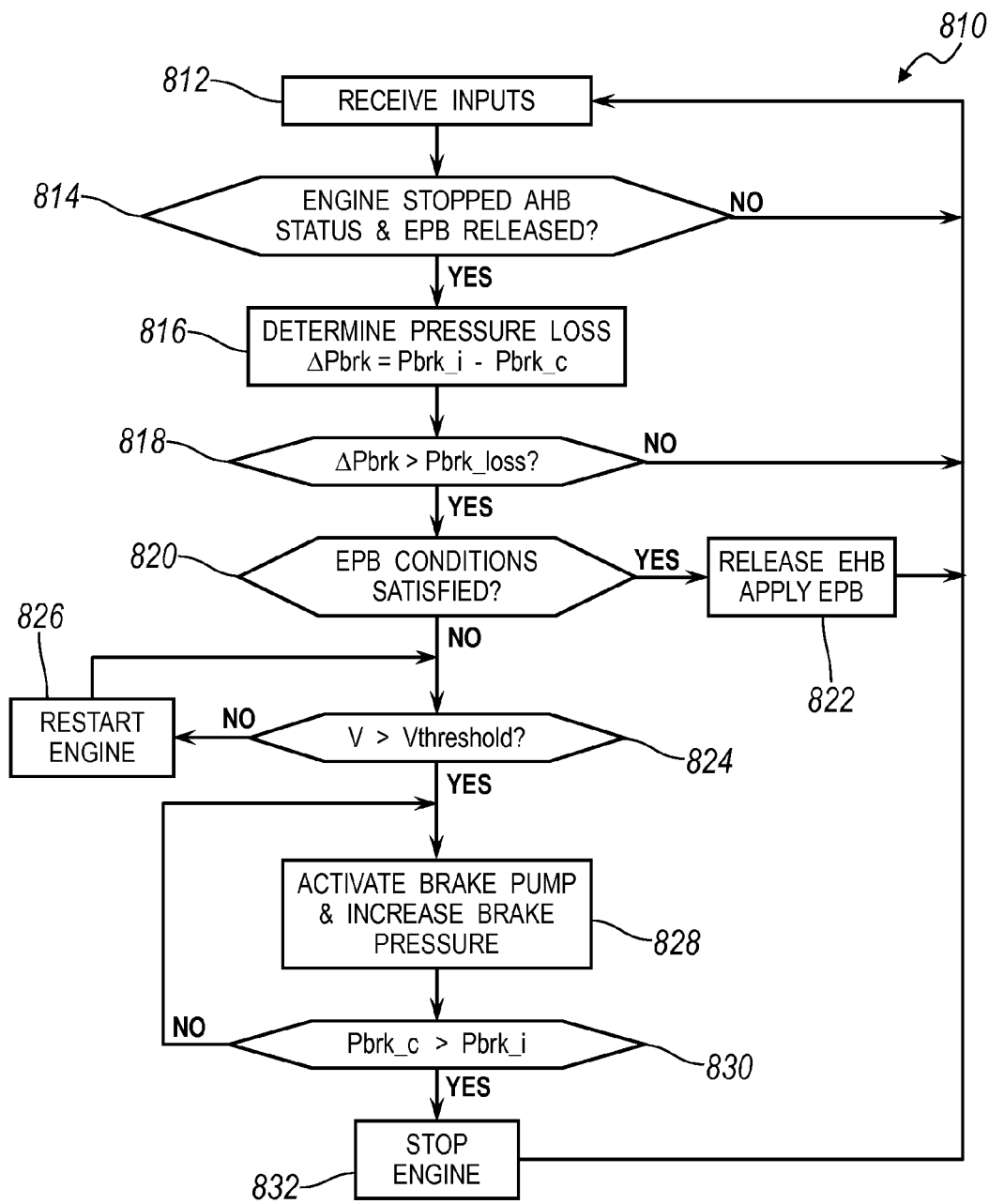
FIG. 8 is a flow chart illustrating a method for coordinating brake systems and monitoring brake pressure during engine shutdown according to one or more embodiments.

With reference to FIGS. 7 and 8, once the AHB is active, the vehicle system 10 coordinates the control of the primary and secondary brake systems for maximizing the amount of time in which the engine 16 may be shutdown to improve fuel economy. FIG. 7 illustrates a method that is based primarily on system voltage and FIG. 8 illustrates a method that is based primarily on brake pressure. Both methods allow the driver to relax and to at least partially release the brake pedal without restarting the engine 16.

Referring to FIG. 7, a method for coordinating the control of the primary brake system 22 and the secondary brake system 24 during engine shutdown is illustrated in accordance with one or more embodiments and generally referenced by numeral 710. The method 710 is implemented using software code contained within the brake controller 20 according to one or more embodiments. In other embodiments, the software code is shared between multiple controllers (e.g., the brake controller 20, the VSC 18 and the ECM 14).

The primary brake system 22 includes the electric brake pump 47 for maintaining the brake pressure (Pbrk) when the engine 16 is shutdown. The electric brake pump 47 draws electrical energy from the battery 50 to maintain Pbrk. Further, the electric brake pump 47 includes electromagnetic valves that can only maintain Pbrk for a limited period of time. Thus the vehicle system 10 monitors the voltage (V) of the battery 50 and the time elapsed since the AHB was activated, and activates the secondary brake system 24 to supply additional torque to assist the primary brake system 22 according to the method 710.

At operation 712 the vehicle system 10 receives inputs including: Ne, AHBstatus, EPBapply, V, Pbrk and t (the time elapsed since the AHB was activated). At operation 714 the vehicle system 10 evaluates Ne, AHBstatus and EPBapply to determine if the engine is stopped, the AHB is active and the EPB is released. If all of these conditions are satisfied, then the vehicle system 10 determines that only the primary brake system 22 is currently being used to hold the vehicle 12 at standstill. If the determination at operation 714 is positive, then the vehicle system 10 proceeds to operation 716.

At operation 716 the vehicle system 10 evaluates the battery voltage (V) to determine if V is within a predetermined AHB range (Vmin<V<Vthreshold). In one embodiment, Vmin is equal to 7.5 volts and Vthreshold is equal to 9.0 volts. If V is within the predetermined range, the vehicle system 10 proceeds to operation 718.

At operation 718, the vehicle system 10 evaluates the elapsed time (t) since the AHB was activated to determine if t is greater than a time threshold. In one embodiment, the time threshold is a value between three and four minutes. If the determination at operation 718 is positive, then the vehicle system 10 applies the EPB system 24 and releases the electric pump 47 at operation 720. Referring back to FIG. 3, reference numeral 721 represents a point at which the vehicle system 10 simultaneously applies the EPB 24 and releases the electric pump 47, once V decreases below Vthreshold and t exceeds the time threshold. The vehicle system 10 coordinates this transition of increasing Tepb and decreasing Tahb so that the total brake torque (Tbrk) remains constant and greater than Thold, as illustrated by Tbrk. At operation 722 the vehicle system 10 evaluates the brake torque (Tbrk) to determine if Tbrk is greater than Thold. If the determination at operation 722 is negative, then the vehicle system 10 returns to operation 720 to further apply the EPB system 24 to increase the total brake torque (Tbrk). If the determination at operation 722 is positive, the vehicle system 10 proceeds to operation 724.

At operation 724 the vehicle system 10 evaluates the battery voltage (V) again to determine if V is less than the minimum voltage level (Vmin). The secondary brake system 24 (EPB) also requires electrical energy to apply and to release brake torque. However, the voltage required to release the EPB system 24 is less than the voltage required to operate the electric brake pump 47. Therefore the vehicle system 10 uses the secondary (EPB) brake system 24 to hold the vehicle when V is less than Vthreshold, but greater than Vmin. However, when V is less than Vmin, the vehicle system 10 proceeds to operation 726 and restarts the engine 16. Referring back to FIG. 3, point 727 represents a point at which V decreases below Vmin and the vehicle system 10 restarts the engine 16. The vehicle 12 includes an alternator (not shown) that is coupled to an output shaft of the engine 16 and generates electrical energy for charging the battery 50 from the engine output torque. By restarting the engine 16, the battery voltage (V) increases and the engine creep torque (Tcreep) increases. The vehicle system 10 returns to operation 712 after operation 726 or in response to a negative determination at operations 714, 716, 718 or 724.

With reference to FIG. 8, a method for coordinating the control of the primary brake systems 22 and the secondary brake systems 24 during engine shutdown is illustrated in accordance with one or more embodiments and generally referenced by numeral 810. The method 810 is implemented using software code contained within the brake controller 20 according to one or more embodiments. In other embodiments, the software code is shared between multiple controllers (e.g., the brake controller 20, the VSC 18 and the ECM 14).

The primary brake system 22 generates fluid pressure (Pbrk) which applies a clamp force to the wheels and results in the brake torque (Tbrk). As described above with reference to FIG. 7, the fluid pressure may decrease as the battery voltage decreases due to limitations of the electric pump 47. Additionally, the fluid pressure may decrease if there is any fluid leakage from the hydraulic system (e.g., from the hydraulic lines 46). Therefore the vehicle system 10 monitors the brake pressure (Pbrk) and applies the EPB system 24 to assist the primary brake system 22 according to the method 810.

At operation 812 the vehicle system 10 receives inputs including: Ne, AHBstatus, EPBapply, V and Pbrk. At operation 814 the vehicle system 10 evaluates Ne, AHBstatus and EPBapply to determine if the engine 16 is stopped, the AHB is active and the EPB is released. If all of these conditions are satisfied, then the vehicle system 10 determines that only the primary brake system 22 is currently being used to hold the vehicle 12 at standstill. If the determination at operation 814 is positive, then the vehicle system 10 proceeds to operation 816.

At operation 816 the vehicle system 10 determines a change in brake pressure (ΔPbrk) since the AHB was activated. The vehicle system 10 records the initial brake pressure after AHB is activated (Pbrk_i). The vehicle system 10 compares the current brake pressure (Pbrk_c) to Pbrk_i to determine ΔPbrk, (i.e., ΔPbrk=Pbrk_i−Pbrk_c). At operation 818 the vehicle system 10 compares ΔPbrk to a pressure loss threshold (Pbrk_loss) to determine if ΔPbrk>Pbrk_loss. If the determination at operation 818 is positive, then the vehicle system 10 proceeds to operation 820.

At operation 820 the vehicle system 10 determines if the electric parking brake (EPB) conditions are satisfied. The vehicle system 10 evaluates the battery voltage (V) to determine if V is greater than the voltage threshold (Vthreshold). The vehicle system 10 also evaluates the elapsed time since the AHB was activated (t) to determine if t is greater than a time threshold. If the EPB conditions are satisfied, then the vehicle system 10 proceeds to operation 822, releases the electric pump 47 of the EHB system and applies the EPB 24. Referring back to FIG. 3, point 823 represents a point at which ΔPbrk exceeds Ploss and the vehicle system 10 releases the electric pump 47 and applies the EPB 24. If the vehicle system 10 determines that the EPB conditions are not satisfied at operation 820, then the vehicle system 10 proceeds to operation 824.

At operation 824 the vehicle system 10 evaluates the battery voltage (V) to determine if V is greater than the voltage threshold (Vthreshold). Vthreshold represents a minimum battery voltage for the electric pump 47 to maintain brake pressure (Pbrk). If V is not greater than Vthreshold, then the vehicle system 10 proceeds to operation 826 and restarts the engine 16. If V is greater than Vthreshold, then the vehicle system 10 activates the brake pump 47 to increase Pbrk at operation 828.

At operation 830 the vehicle system compares the current brake pressure (Pbrk_c) to the initial brake pressure (Pbrk_i) to determine if Pbrk_c>Pbrk_i. If the determination at operation 830 is negative (i.e., Pbrk_c is not greater than Pbrk_i), then the vehicle system 10 returns to operation 828 to activate the electric pump 47. The vehicle system 10 continues this loop until it reaches a positive determination at operation 830 (Pbrk_c>Pbrk_i) and then proceeds to operation 832 and stops the engine 16. The vehicle system 10 returns to operation 812 after operation 832, 822 or after a negative determination in operations 814 or 818.

As such the vehicle system 10 provides advantages over existing methods by coordinating the control of the primary brake system 22 and the secondary brake system 24 to extend the period of time in which the engine 16 is shutdown, which results in improved fuel economy. Additionally, the vehicle system 10 analyzes inputs other than brake pedal position and brake pressure to determine when to restart the engine 16, which allows the driver to relax and at least partially release the brake pedal 38 during engine shutdown.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A vehicle comprising:
   an engine adapted to shutdown and restart during a drive cycle;
   a first brake system adapted to generate a first brake torque;
   a second brake system adapted to generate a second brake torque; and
   a controller programmed to:
   shutdown the engine in response to brake pressure exceeding a pressure threshold;

restart the engine in response to an accelerator pedal position exceeding a position threshold independent of brake pressure;

decrease the first brake torque and decrease the second brake torque in response to an engine restart; and increase the first brake torque to a torque threshold in response to the brake pressure decreasing below the pressure threshold, wherein the torque threshold and the pressure threshold correspond to brake conditions at which the engine was shutdown.

2. The vehicle of claim 1 wherein the first brake system comprises an electric brake pump coupled to a hydraulic brake system and the second brake system comprises an electric park brake coupled to at least one brake caliper, and wherein the controller is further programmed to restart the engine in response to the electric park brake being applied and the accelerator pedal position exceeding the position threshold.

3. The vehicle of claim 1 wherein the controller is further programmed to:

increase the first brake torque to a torque threshold in response to an engine shutdown; and release the first brake system and increase the second brake torque to the torque threshold in response to a battery voltage decreasing below a voltage threshold, wherein the torque threshold corresponds to brake torque at which the engine was shutdown.

4. The vehicle of claim 3 wherein the controller is further programmed to maintain a total brake torque above the torque threshold while increasing the second brake torque and decreasing the first brake torque in response to the battery voltage decreasing below the voltage threshold, wherein the total brake torque is equal to a sum of the first brake torque and the second brake torque.

5. The vehicle of claim 3 wherein the controller is further programmed to restart the engine in response to the battery voltage decreasing below a second voltage threshold, wherein the second voltage threshold is less than the voltage threshold.

6. A vehicle system comprising:

a first brake system adapted to generate a first brake torque;

a second brake system adapted to generate a second brake torque; and a controller programmed to:

increase the first brake torque to a torque threshold in response to engine shutdown, decrease the first brake torque and increase the second brake torque in response to a battery voltage decreasing below a voltage threshold, and release the first and second brake systems responsive to an engine restart.

7. The vehicles system of claim 6 wherein the controller is further programmed to maintain a total brake torque above the torque threshold while increasing the second brake torque and decreasing the first brake torque in response to the battery voltage decreasing below the voltage threshold, wherein the total brake torque is equal to a sum of the first brake torque and the second brake torque.

8. The vehicle system of claim 6 wherein the controller is further programmed to restart the engine in response to the battery voltage decreasing below a second voltage threshold, wherein the second voltage threshold is less than the voltage threshold.

9. The vehicle system of claim 6 wherein the controller is further programmed to decrease the first brake torque and increase the second brake torque in response to a change in brake pressure exceeding a pressure loss threshold.

10. The vehicle system of claim 6 wherein the first brake system comprises an electric brake pump coupled to a hydraulic brake system and the second brake system comprises an electric park brake coupled to at least one brake caliper.

11. A method for controlling brake systems, comprising:

shutting down an engine responsive to brake pressure exceeding a pressure threshold;

controlling a first brake system to increase a first brake torque above a torque threshold in response to engine shutdown; and controlling the first brake system to decrease the first brake torque and controlling a second brake system to increase a second brake torque in response to a battery voltage decreasing below a voltage threshold.

12. The method of claim 11 further comprising maintaining a total brake torque above the torque threshold while increasing the second brake torque and decreasing the first brake torque in response to the battery voltage decreasing below the voltage threshold, wherein the total brake torque is equal to a sum of the first brake torque and the second brake torque.

13. The method of claim 11 further comprising restarting the engine and decreasing the second brake torque in response to the battery voltage decreasing below a second voltage threshold, wherein the second voltage threshold is less than the voltage threshold.

14. The method of claim 11 further comprising decreasing the first brake torque and increasing the second brake torque to the torque threshold in response to a change in brake pressure exceeding a pressure loss threshold.

15. The method of claim 11 further comprising restarting the engine in response to an accelerator pedal position exceeding a position threshold and independent of brake pressure.

16. The method of claim 11 further comprising decreasing the first brake torque and the second brake torque in response to an engine restart.

* * * * *